United States Patent [19]

Kaburagi et al.

[11] Patent Number: 5,777,759
[45] Date of Patent: Jul. 7, 1998

[54] IMAGE PROCESSING METHOD AND APPARATUS

[75] Inventors: Hiroshi Kaburagi, Yokohama; Hiroyuki Ichikawa, Kawasaki, both of Japan

[73] Assignee: Canon Kabushiki Kaisha, Tokyo, Japan

[21] Appl. No.: 637,442

[22] Filed: Apr. 25, 1996

[30] Foreign Application Priority Data

| Apr. 28, 1995 | [JP] | Japan | 7-105789 |
| Feb. 21, 1996 | [JP] | Japan | 8-033623 |
| Feb. 27, 1996 | [JP] | Japan | 8-039859 |

[51] Int. Cl.[6] .................................................. H04N 1/21
[52] U.S. Cl. ............................... 358/536; 358/456
[58] Field of Search ............................ 358/536–538, 358/456–460, 298, 429; 399/180–182

[56] References Cited

U.S. PATENT DOCUMENTS

| 4,780,768 | 10/1988 | Tomohisa et al. | 358/298 |
| 4,884,080 | 11/1989 | Hirahara et al. | 346/46 |
| 4,977,464 | 12/1990 | Ikuta | 358/456 |
| 5,495,278 | 2/1996 | Oda et al. | 347/252 |
| 5,546,197 | 8/1996 | Shibazaki et al. | 358/536 |

FOREIGN PATENT DOCUMENTS

| 0204202 | 10/1987 | European Pat. Off. . |
| 0293214 | 5/1988 | European Pat. Off. . |
| 0292292 | 11/1988 | European Pat. Off. . |
| 0304289 | 2/1989 | European Pat. Off. . |
| 0667703 | 8/1995 | European Pat. Off. . |
| 2091518 | 7/1982 | United Kingdom . |

*Primary Examiner*—David K. Moore
*Assistant Examiner*—Stephen Brinich
*Attorney, Agent, or Firm*—Fitzpatrick, Cella, Harper & Scinto

[57] ABSTRACT

An image processing apparatus includes an input unit for inputting image information, and a conversion unit for comparing the input image information with a plurality of threshold values and converting the input image information into data of three or more levels, wherein the conversion unit converts the input image information so as to form a dot at the central area of a screen mask if the input image information is low in density, and converts the input image information so as to form dots at the whole area of a screen mask if the input image information is middle and high in density.

24 Claims, 22 Drawing Sheets

FIG.4

(A)
```
/*----- level 0 -----*/
  0    0    0    0
  0    0    0
  0    0    0
```

(B)
```
/*----- level 1 -----*/
124   43  144  185
 22    2   63
104   83  165
```

(C)
```
/*----- level 2 -----*/
126   44  146  187
 24    3   65
105   85  167
```

(D)
```
/*----- level 3 -----*/
127   63  148  189
 26    5   66
107   87  168
```

(E)
```
/*----- level 4 -----*/
129   48  150  190
 27    7   68
109   88  170
```

(F)
```
/*----- level 5 -----*/
131   49  151  195
 29    9   70
110   90  173
```

(G)
```
/*----- level 6 -----*/
133   51  153  194
 31   10   71
112   92  165
```

(H)
```
/*----- level 7 -----*/
134   53  155  195
 32   12   73
114   93  175
```

(I)
```
/*----- level 8 -----*/
136   54  156  197
 34   14   75
116   95  177
```

(J)
```
/*----- level 9 -----*/
138   56  158  199
 36   15   77
117   97  178
```

(K)
```
/*----- level 10 -----*/
139   58  160  201
 37   17   78
119   99  180
```

(L)
```
/*----- level 11 -----*/
141   60  161  202
 39   19   80
121  100  182
```

(M)
```
/*----- level 12 -----*/
143   61  163  204
 41   20   82
122  102  184
```

(N)
```
/*----- level 13 -----*/
216  209  218  221
207  206  211
214  212  219
```

(O)
```
/*----- level 14 -----*/
233  226  235  238
224  223  228
231  229  236
```

(P)
```
/*----- level 15 -----*/
250  243  252  255
241  240  245
248  246  253
```

FIG.5

(A)
```
/*----- level 0 -----*/
  0    0    0    0
  0    0    0
  0    0    0
```

(B)
```
/*----- level 1 -----*/
 12    5   14
  3    2    7
 10    9   15   17
```

(C)
```
/*----- level 2 -----*/
 29   22   31
 20   19   24
 27   26   32   34
```

(D)
```
/*----- level 3 -----*/
 46   39   48
 37   36   41
 44   43   49   51
```

(E)
```
/*----- level 4 -----*/
 63   56   65
 54   53   58
 61   60   66   68
```

(F)
```
/*----- level 5 -----*/
 80   73   82
 71   70   75
 78   77   83   85
```

(G)
```
/*----- level 6 -----*/
 97   90   99
 88   87   92
 95   93  100  102
```

(H)
```
/*----- level 7 -----*/
114  107  116
105  104  109
112  110  117  119
```

(I)
```
/*----- level 8 -----*/
131  124  133
122  121  126
129  127  134  136
```

(J)
```
/*----- level 9 -----*/
148  141  150
139  138  143
146  144  151  153
```

(K)
```
/*----- level 10 -----*/
165  158  167
156  155  160
163  161  168  170
```

(L)
```
/*----- level 11 -----*/
182  175  184
173  172  177
180  178  185  187
```

(M)
```
/*----- level 12 -----*/
199  192  201
190  189  194
197  195  202  204
```

(N)
```
/*----- level 13 -----*/
216  209  218
207  206  211
214  212  219  221
```

(O)
```
/*----- level 14 -----*/
233  226  235
224  223  228
231  229  236  238
```

(P)
```
/*----- level 15 -----*/
250  243  252
241  240  245
248  246  253  255
```

FIG.6

(A)
```
/*----- level 0 -----*/
   0    0    0   0
   0    0    0
   0    0    0
```

(B)
```
/*----- level 1 -----*/
  15    9   17
   7    2   10
  14   12   19   20
```

(C)
```
/*----- level 2 -----*/
  32   26   34
  24    3   27
  31   29   36   37
```

(D)
```
/*----- level 3 -----*/
  49   43   51
  41    5   44
  48   46   53   54
```

(E)
```
/*----- level 4 -----*/
  66   60   68
  58   22   61
  65   63   70   71
```

(F)
```
/*----- level 5 -----*/
  83   77   85
  75   39   78
  82   80   87   88
```

(G)
```
/*----- level 6 -----*/
 100   93  102
  92   56   95
  99   97  104  105
```

(H)
```
/*----- level 7 -----*/
 117  110  119
 109   73  112
 116  114  121  122
```

(I)
```
/*----- level 8 -----*/
 134  127  136
 126   90  129
 133  131  138  139
```

(J)
```
/*----- level 9 -----*/
 151  144  153
 143  107  146
 150  148  155  156
```

(K)
```
/*----- level 10 -----*/
 167  160  168
 158  124  161
 165  163  170  172
```

(L)
```
/*----- level 11 -----*/
 182  175  184
 173  141  177
 180  178  185  187
```

(M)
```
/*----- level 12 -----*/
 199  192  201
 190  189  194
 197  195  202  204
```

(N)
```
/*----- level 13 -----*/
 216  209  218
 207  206  211
 214  212  219  221
```

(O)
```
/*----- level 14 -----*/
 233  226  235
 224  223  228
 231  229  236  238
```

(P)
```
/*----- level 15 -----*/
 250  243  252
 241  240  245
 248  246  253  255
```

FIG.7

(A)
```
/* ----- level 0 ----- */
    0    0    0
    0    0    0    0
    0    0    0
```

(B)
```
/* ----- level 1 ----- */
   22   15   24
   14    2   17
   20   19   26   27
```

(C)
```
/* ----- level 2 ----- */
   39   32   41
   31    3   34
   37   36   43   44
```

(D)
```
/* ----- level 3 ----- */
   56   49   58
   48    5   51
   54   53   60   61
```

(E)
```
/* ----- level 4 ----- */
   73   66   75
   65    7   68
   71   70   77   78
```

(F)
```
/* ----- level 5 ----- */
   90   83   92
   82    9   85
   88   87   93   95
```

(G)
```
/* ----- level 6 ----- */
  105   99  107
   97   10  100
  104  102  109  110
```

(H)
```
/* ----- level 7 ----- */
  121  114  122
  112   12  116
  119  117  124  126
```

(I)
```
/* ----- level 8 ----- */
  136  129  138
  127   29  131
  134  133  139  141
```

(J)
```
/* ----- level 9 ----- */
  151  144  153
  143   46  146
  150  148  155  156
```

(K)
```
/* ----- level 10 ----- */
  167  160  168
  158   63  161
  165  163  170  172
```

(L)
```
/* ----- level 11 ----- */
  182  175  184
  173   80  177
  180  178  185  187
```

(M)
```
/* ----- level 12 ----- */
  199  192  201
  190  189  194
  197  195  202  204
```

(N)
```
/* ----- level 13 ----- */
  216  209  218
  207  206  211
  214  212  219  221
```

(O)
```
/* ----- level 14 ----- */
  233  226  235
  224  223  228
  231  229  236  238
```

(P)
```
/* ----- level 15 ----- */
  250  243  252
  241  240  245
  248  246  253  255
```

FIG.8A
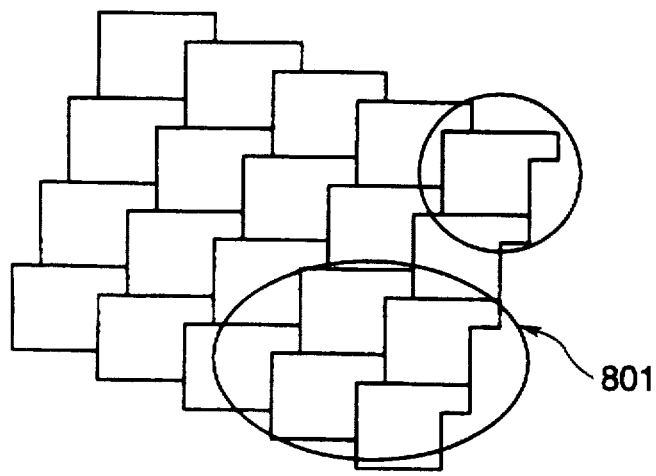
801
FIG.8B
| 7 | 8 | 9 | 10 |
|---|---|---|---|
| 6 | 1 | 2 | |
| 5 | 4 | 3 | |
802
FIG.8C
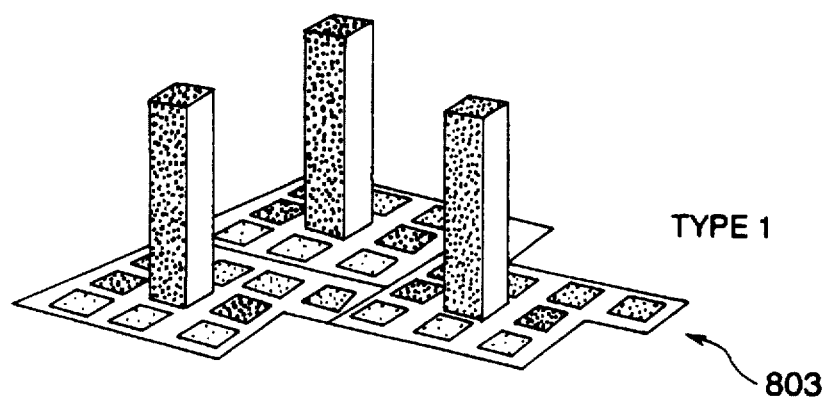
TYPE 1
803

901

902

TYPE 2

903

1001

1002

TYPE 3

1003

TYPE 1

TYPE 2

TYPE 3

MASK REPEAT PATTERN SIZE (10×10)

SCREEN MASK SIZE (3×4)
EXAMPLE OF PATTERN (B) IN FIG.5

FIG. 16A — IN CASE OF USING SCREEN PATTERNS SHOWN IN FIG.4
FIG. 16B — IN CASE OF USING SCREEN PATTERNS SHOWN IN FIG.5
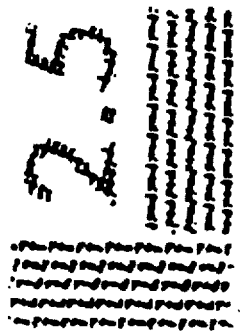
FIG. 16C — IN CASE OF USING SCREEN PATTERNS SHOWN IN FIG.7

FIG. 18A

| | 7 | 4 | 8 | |
|---|---|---|---|---|
| | 3 | 1 | 5 | |
| | 6 | 2 | 9 | 10 |

SCREEN ANGLE = 71.6 DEGREE
NUMBER OF SCREEN LINES = 190 LINES

Msize = 10

Mmax = 16

Mseq [7] = 1    Mseq [4] = 2    Mseq [8] = 3
Mseq [3] = 4    Mseq [1] = 5    Mseq [5] = 6
Mseq [6] = 7    Mseq [2] = 8    Mseq [9] = 9
Mseq [10] = 10

FIG. 18B

| | | 12 | | |
|---|---|---|---|---|
| | 7 | 4 | 8 | |
| 11 | 3 | 1 | 5 | 13 |
| | 6 | 2 | 9 | |
| | | 10 | | |

SCREEN ANGLE = 56.3 DEGREE
NUMBER OF SCREEN LINES = 160 LINES

Msize = 13

Mmax = 16

Mseq [12] = 1    Mseq [7] = 2    Mseq [4] = 3
Mseq [8] = 4     Mseq [11] = 5   Mseq [3] = 6
Mseq [1] = 7     Mseq [5] = 8    Mseq [13] = 9
Mseq [6] = 10    Mseq [2] = 11   Mseq [9] = 12
Mseq [10] = 13

FIG. 18C

| 3 | 5 | 13 | 9 |
|---|---|---|---|
| 7 | 1 | 11 | 15 |
| 14 | 10 | 4 | 6 |
| 12 | 16 | 8 | 2 |

SCREEN ANGLE = 45.0 DEGREE
NUMBER OF SCREEN LINES = 212 LINES

Msize = 16

Mmax = 16

Mseq [3] = 1     Mseq [5] = 2     Mseq [13] = 3
Mseq [9] = 4     Mseq [7] = 5     Mseq [1] = 6
Mseq [11] = 7    Mseq [15] = 8    Mseq [14] = 9
Mseq [10] = 10   Mseq [4] = 11    Mseq [6] = 12
Mseq [12] = 13   Mseq [16] = 11   Mseq [8] = 12
Mseq [2] = 13

FIG.20

$$\text{STEP VALUE} = \frac{255}{(\text{MASK SIZE}) \times (\text{Mmax}-1)}$$

```
COUNTER VALUE = 0
for(ii = 0 ; ii < Msize ; ii + +){
  for(X = 0 ; X < Mpeak ; X + +){
    Y = Mseq [ii]
      COUNTER VALUE = COUNTER VALUE + STEP VALUE

OUTPUT 1 = X
      OUTPUT 2 = Y
      OUTPUT 3 = COUNTER VALUE
  }
}

FOR(X = Mpeak ; X < Mmax ; X + +){
  FOR(ii = 0 ; ii < Msize ; ii + +){
    Y = Mseq [ii]
      COUNTER VALUE = COUNTER VALUE + STEP VALUE

OUTPUT 1 = X
      OUTPUT 2 = Y
      OUTPUT 3 = COUNTER VALUE
  }
}
```

Mmax = NUMBER OF GRADATIONS
Msize = MASK SIZE
Mpeak = PEAK LEVEL SETTING VALUE
Mseq [ ] = PIXEL FATTENING ORDER IN MASK

IMAGE PROCESSING METHOD AND APPARATUS

BACKGROUND OF THE INVENTION

1. Field of the Invention

The present invention relates to an image processing method and apparatus for forming a half-tone image using screen patterns.

2. Related Background Art

A screen process is known as a means for forming a half-tone image. The screen process is characterized in that a stable half-tone image can be formed by using a small number of gradation steps, for an original such as a photograph and an original having a uniform density without a shade difference.

Although an image formed by dots specific to a screen becomes stable by such a screen process, the edge portions of thin lines and characters have notches under the influence of a screen pattern.

Depending upon the number of lines and a screen angle of the screen process, interference occurs with the screen angle of a read original and conspicuous moire is generated. Examples of such moire are shown in FIG. 22.

If a screen pattern is changed to output a smooth image of fine lines and characters without notches, a pictorial image such as a photograph is not formed with dots specific to the screen. Therefore, a stable image reproduction is impossible.

One of conventional screen processes can select a desired screen from a plurality of screen angles and lines.

However, with a screen process having a selected screen angle, although an image formed with dots specific to the screen becomes stable, the images of fine lines and characters have notched edges under the influence of screen patterns, because a method of fattening pixels of screen masks cannot be selected.

SUMMARY OF THE INVENTION

It is an object of the present invention to provide an image processing method and apparatus solving the above disadvantages of conventional techniques and being capable of forming the images of fine lines and characters without notched edges even with a screen process.

It is another object of the present invention to provide an image processing method and apparatus capable of suppressing moire to be generated through interference with a dot original when a screen process is performed.

It is a further object of the present invention to provide an image processing method and apparatus capable of forming the images of fine lines and characters without notches and forming stable half-tone images of photographs or the like, by using a screen pattern selected from a plurality of screen patterns prepared in advance.

It is a still further object of the present invention to provide an image processing method and apparatus capable of achieving an image process matching the quality of an input image, by selecting a screen pattern from a plurality of screen patterns in accordance with the state of edges of the input image.

It is another object of the present invention to provide an image processing method and apparatus capable of selecting a desired image forming method by allowing a user to set a desired fattening process of pixels of a screen matrix, the image forming method including a method of forming a stable image with clearly reproduced dots of a screen, a method of forming an image with unclearly reproduced dots of a screen, a method of forming an image with suppressed edge notches, and other methods.

The above and other objects and advantages of the present invention will become apparent from the following detailed description when read in connection with the accompanying drawings.

BRIEF DESCRIPTION OF THE DRAWINGS

FIGS. 4 to 7 are diagrams showing examples of screen patterns used by the screen processing unit.

FIGS. 8a–8c are diagrams illustrating a growth of screen pixels using the screen pattern shown in FIG. 4.

FIGS. 16a–16c are diagrams illustrating the output results by the screen process according to the embodiment of the invention.

FIGS. 18a–18c are diagrams showing examples of screen patterns stored in a screen mask memory.

FIG. 20 is a diagram illustrating a screen data generating unit.

DETAILED DESCRIPTION OF THE PREFERRED EMBODIMENTS

Preferred embodiments of the present invention will be described in detail with reference to the accompanying drawings.

(First Embodiment)

Described first is an example of detecting edges of an input image and selecting in accordance with the detected results a screen associated with a different dot growth method.

Figure 1:
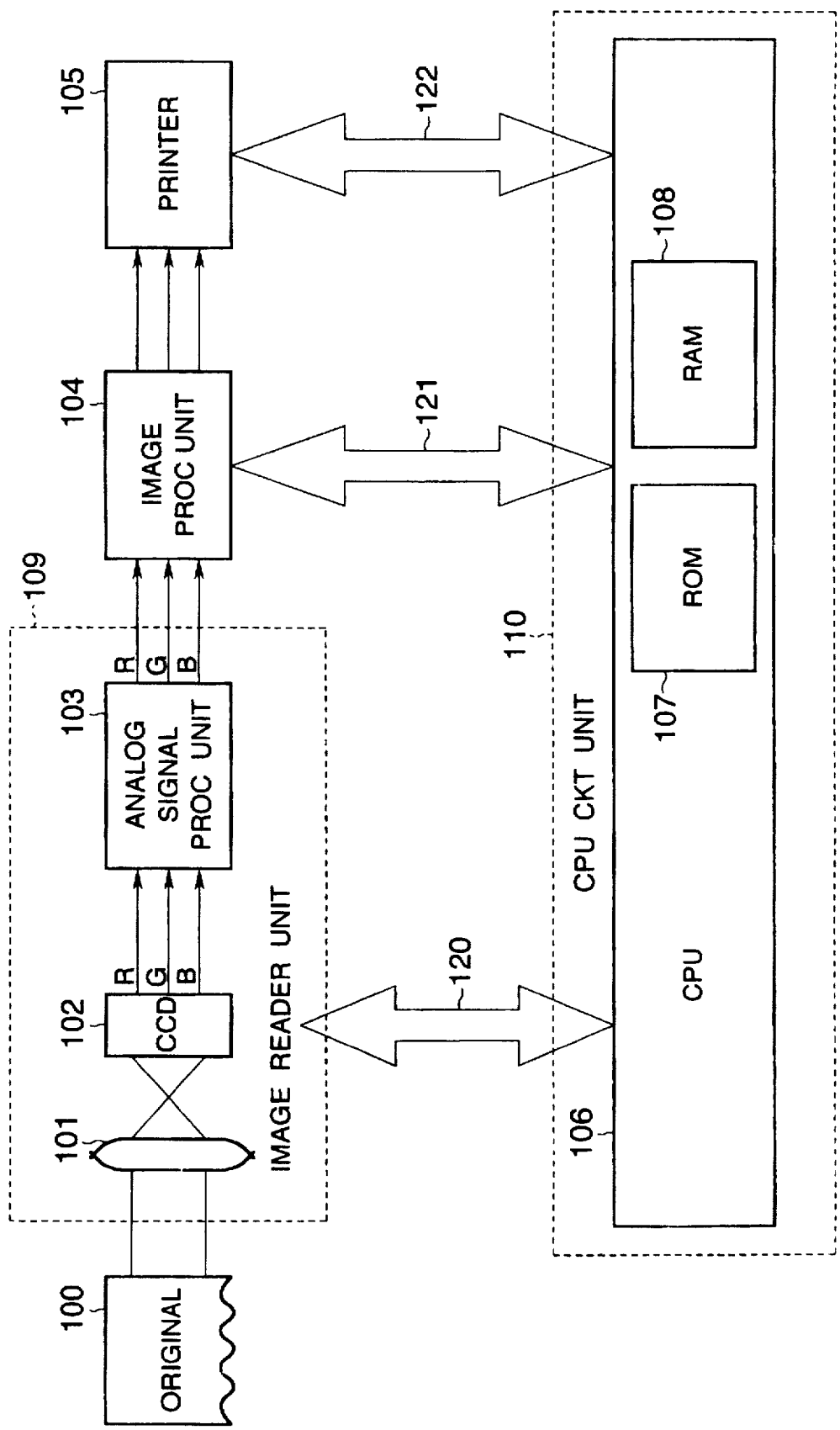
FIG. 1 is a block diagram showing the structure of an image forming apparatus according to an embodiment of the invention.

FIG. 1 is a block diagram showing the structure of an image forming apparatus illustrating the outline of the embodiment of the invention.

An image reader unit 100 has a lens 101 for converging light from an original 100, a CCD sensor 102 for converting light input through the lens 101 into an electrical signal, an analog signal processing unit 103 for processing a color signal output from the CCD sensor 102, and other necessary elements. The CCD sensor 102 converts an original image focussed thereon via the lens 101 into analog electrical signals for R (red), G (green), and B (blue). The converted RGB image information is input to the analog signal processing unit 103, subjected to a sample-and-hold process for each color R, G, and B and a dark level correction process and the like, and thereafter analog/digital (A/D) converted to be output as a digital image signal. The output full-color digital image signal is input to an image processing unit 104.

The image processing unit 104 executes correction processes necessary for a reader system such as shading correction, color correction, and gamma correction, a smoothing process, edge emphasis, and other processes.

The processed image data is output to a printer unit 105. The printer unit 105 may use a laser beam printer, an LED printer, or the like. If a laser printer is used, it has an exposure control unit with a semiconductor laser, an image forming unit, a transport control unit for a transfer sheet, and the like, and records an image on a transfer sheet in accordance with an input image signal.

The printer 105 controls a record time of one pixel or a record intensity of one pixel, and can record a pixel at 16 gradation levels.

A CPU circuit unit 110 has a CPU 106, a ROM 107, a RAM 108, and other circuit elements. ROM 107 stores control programs to be executed by CPU 106 and various data. RAM 108 is used as a working area for the processes by CPU 106 and temporarily stores various data. The CPU circuit unit 110 controls the image reader unit 109, image processing unit 104, printer unit 105, and other necessary elements to supervise the control sequence of the image forming apparatus of this embodiment. Reference numerals 120 to 122 represent control buses interconnecting the CPU circuit unit 110 and other units of the apparatus.

Figure 2:
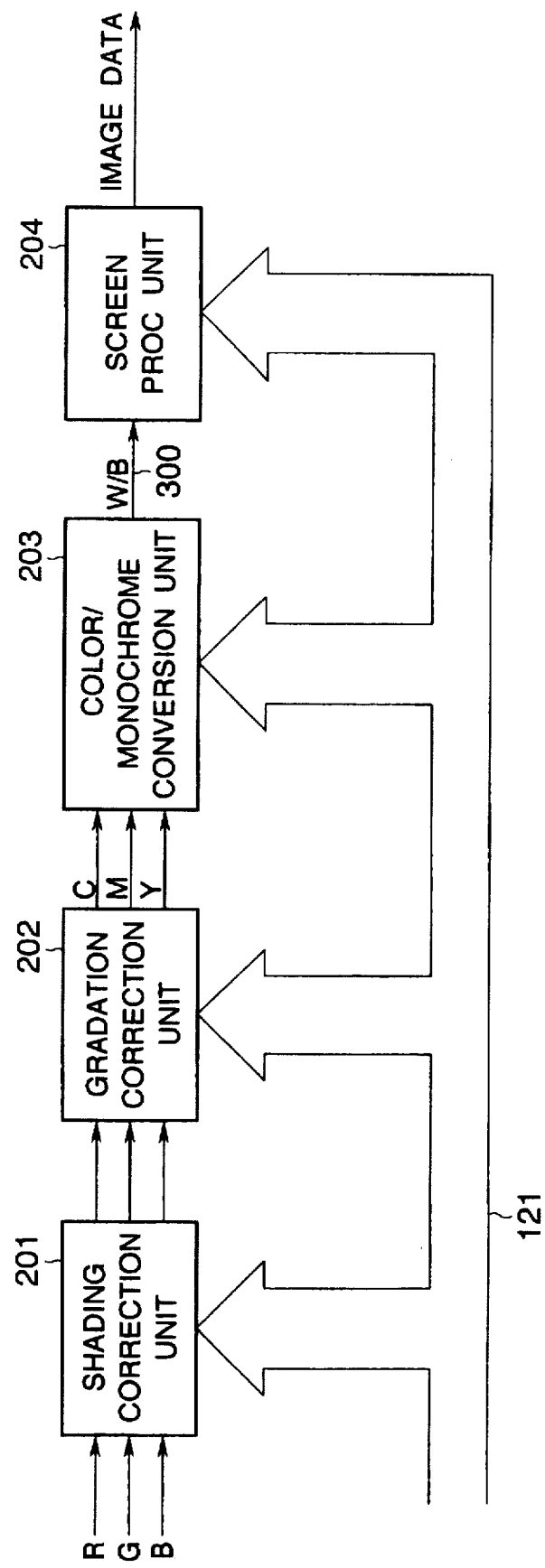
FIG. 2 is a block diagram showing the structure of an image processing unit of the embodiment.

Next, referring to FIG. 2, the structure of the image processing unit 104 will be described. FIG. 2 is a block diagram showing the functional structure of the image processing unit 104.

RGB digital image signals output from the analog signal processing unit 103 are input to a shading correction unit 201. This shading correction unit 201 corrects a variation of characteristics of the CCD sensor 102 which reads an original and the optical distribution of an illuminating lamp which illuminates an original 100. The image signals processed and corrected by the shading correction unit 201 are input to a gradation correction unit 202 which converts luminance signals (RGB) into density data of C (cyan), M (magenta), and Y (yellow). The gradation correction unit 202 generates CMY image density data. The image signals converted into density data are input to a color/monochrome conversion unit 203 which converts the color image data into monochrome (black and white) image data 300. The image data 300 output from the color/monochrome conversion unit 203 is input to a screen processing unit 204 and converted into a screen pattern with which a half-tone image is formed. In this example, image data of one pixel is converted into image data having one of 16 levels. The present invention is applicable to conversion of data of one pixel into data having one of three levels.

Figure 3:
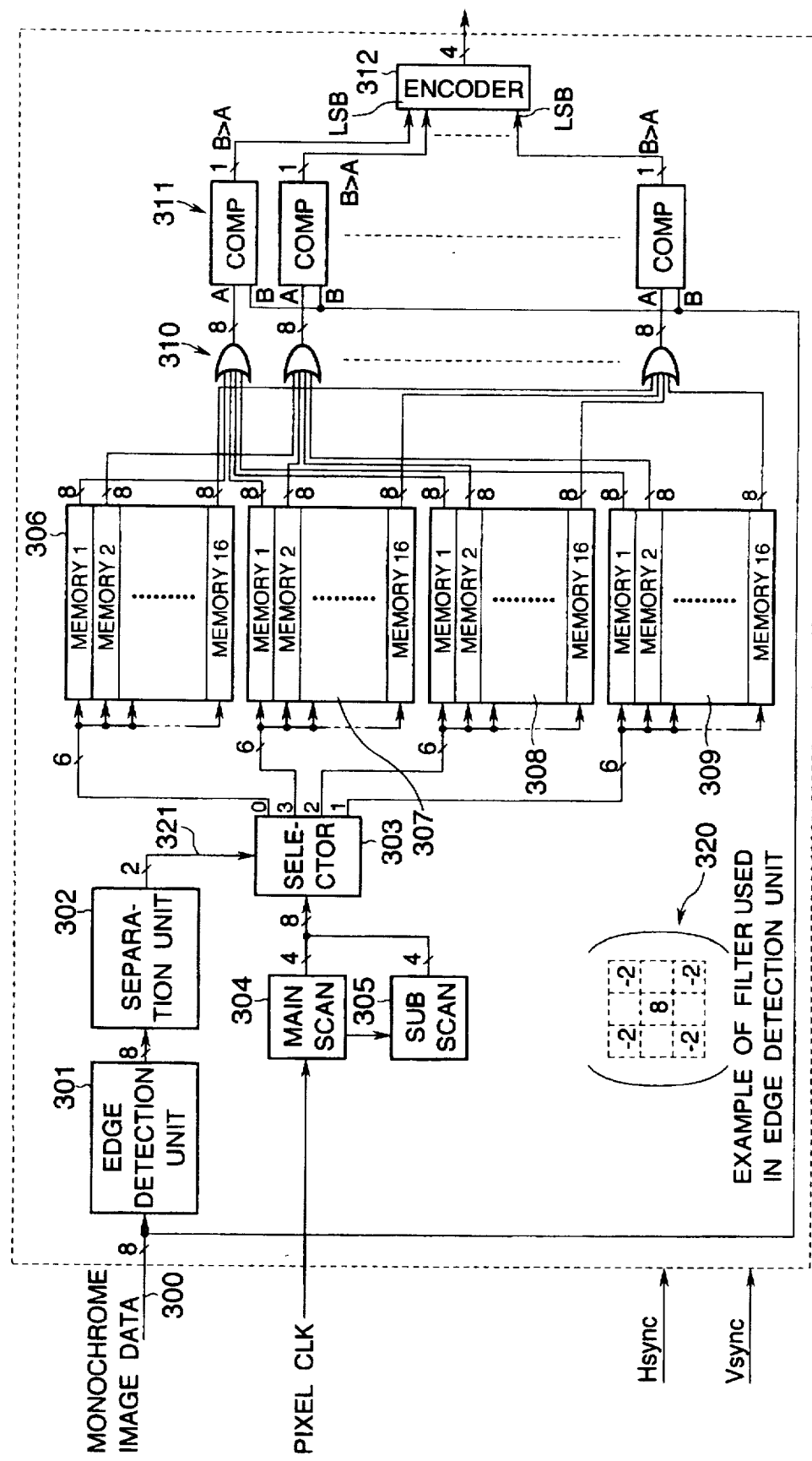
FIG. 3 is a block diagram showing the structure of a screen processing unit according to a first embodiment.

FIG. 3 is a block diagram showing the structure of the screen processing unit 204 which is the main circuit of the first embodiment.

Monochrome image data 300 supplied from the screen processing unit 204 is first input to an edge detection unit 301 which detects an edge portion of the image data 300. An example of a filter used by the edge detection unit 301 is shown at 320, which is a general differential filter.

By using this filter, the edge detection unit 301 performs a matrix calculation of the input image data 300 and outputs the results. If the results are negative, a value "0" is output. Eight-bit data obtained by the edge detection unit 301 is input to a separation unit 302 which performs a threshold value process. With this threshold value process by the separation unit 302, a 2-bit signal 321 of any one of "0/1/2/3" corresponding to the edge intensity is output. If the edge value is large a value "3" is output, and as the edge value becomes smaller, values "2", "1", and "0" gradually becoming smaller are output in this order.

This 2-bit signal 321 is input to a select signal terminal of a selector 303. If the 2-bit signal 321 is "0", an address signal from a main scan 304 and a sub scan 305 is output to a memory 306. If the 2-bit signal 321 is "1", the address signal from the main scan 304 and sub scan 305 is output to a memory 309. If the 2-bit signal 321 is "2", the address signal from the main scan 304 and sub scan 305 is output to a memory 308. If the 2-bit signal 321 is "3", the address signal from the main scan 304 and sub scan 305 is output to a memory 307.

The main scan 304 and sub scan 305 are both, for example, a 4-bit counter which counts a pixel clock signal synchronizing with the image data 300. A carry signal of the main scan counter 304 is input to a clock terminal of the sub scan counter 305. Therefore, an 8-bit address signal is output from the main and sub scan counters 304 and 305.

Each of the memories 306 to 309 can write screen data from CPU 106. In this case, the CPU bus 121 is connected to address and data buses of the memories 306 to 309, and screen data is written in each memory at the address supplied from the CPU bus 121. The screen data is a threshold value to be compared with the input image data. Examples of screen pattern data are shown as patterns (A) to (P) in FIG. 4 and patterns (A) to (P) in FIG. 7. In this embodiment, screen data shown in FIG. 4 is stored in the memory 306, screen data shown in FIG. 5 is stored in the memory 307, screen data shown in FIG. 6 is stored in the memory 308, and screen data shown in FIG. 7 is stored in the memory 309. In each of the memories 306 to 309, data of level "0" is written in a memory field 1, data of level "1" is written in a memory field 2, . . . , and data of level "15" is written in a memory field 16.

The screen data shown in FIG. 4 and stored in the memory 306 has a very strong screen tone degree, and is selected when data from the separation unit 302 is "0", i.e., when it is judged that the image data has no edge. The screen data shown in FIG. 5 and stored in the memory 307 has a very weak screen tone degree, and is selected when data from the separation unit 302 is "3", i.e., when it is judged that the image data has a strong edge. The screen data shown in FIG. 6 and stored in the memory 308 has a weak screen tone degree, and is selected when data from the separation unit 302 is "2", i.e., when it is judged that the edge is intermediary (rather strong). The screen data shown in FIG. 7 and stored in the memory 309 has a strong screen tone degree, and is selected when data from the separation unit 302 is "1", i.e., when it is judged that the edge is intermediary (rather weak).

Although the characteristics of each screen data will be later described, the screen data shown in FIG. 4 used when the image data has no edge forms images such as shown in FIGS. 8a–8c and 11, the screen data shown in FIG. 5 used when the image data has a strong edge forms images such as shown in FIGS. 9a–9c and 12, and the screen data shown in FIG. 7 used when the edge is intermediary forms images such as shown in FIGS. 10a–10c and 13. Images formed by the screen data shown in FIG. 6 are not shown.

In this embodiment, an edge is detected from each image and one of the memories 306 to 309 is selected.

For the screen process to be executed by the screen processing unit 204, data is accessed from each of the memories 306 to 309 in accordance with an output from the main scan and sub scan counters 304 and 305 selected by the selector 303. An output from each of the memories 306 to 309 is input via a corresponding OR circuit 310 to a corresponding comparator 311. The comparator 311 compares the input monochrome image data 300 with an output of each of the memories 306 to 309. If the image data 300 (B input) is larger than the output from the memory, the comparator 311 outputs "1". A 16-bit output from each comparator 311 is encoded by an encoder 312 and output the encoded result as 4-bit data.

This encoder 312 outputs, for example, "0" when 16-bit data "0000000000000000" is input, "1" when "0000000000000001" is input, "2" when 16-bit data "0000000000000011" is input, . . . , and "15" when "0111111111111111" is input. The value of the 16-bit data uses the memory field 16 as the most significant bit (MSB).

Figure 14A:
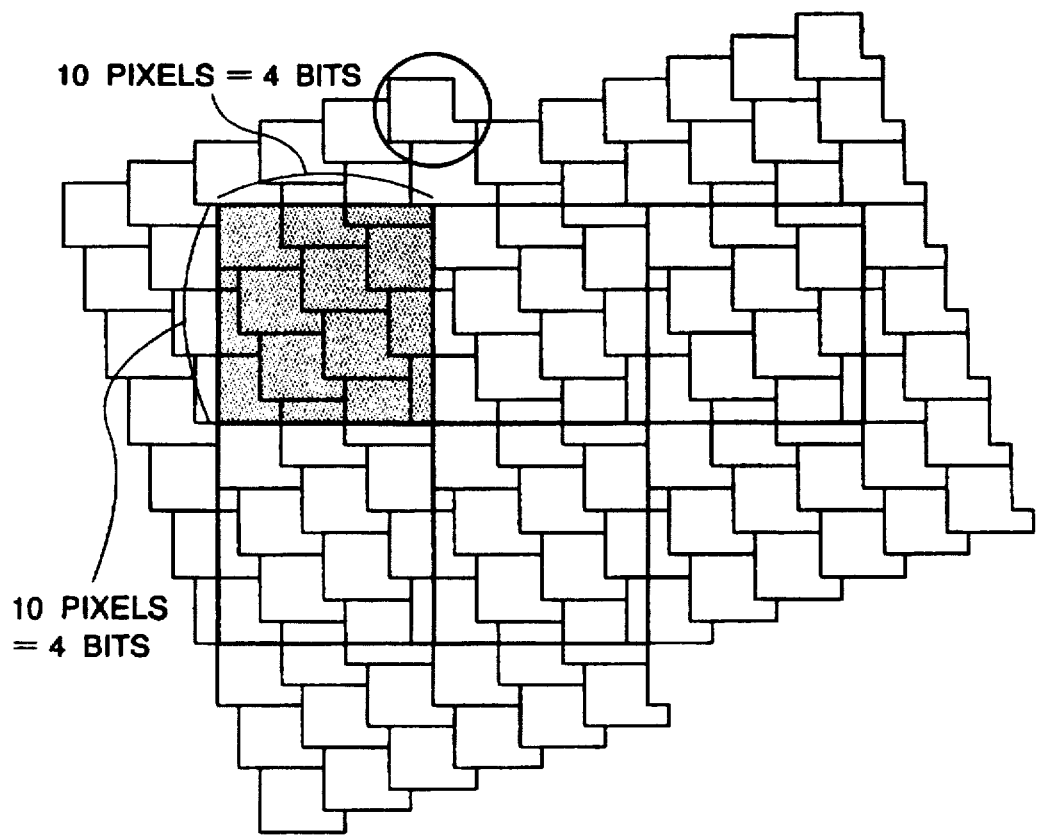
FIGS. 14A and 14B are diagrams illustrating a repetition or repeat period of screen patterns.
Figure 14B:
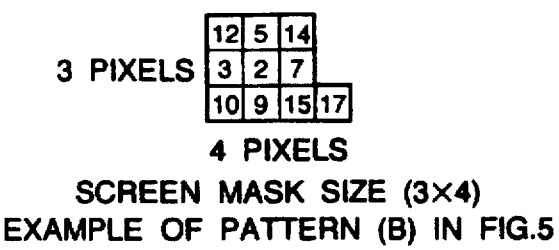

The main and sub scan counters 304 and 305 generate count signals by using Hsync (horizontal sync signal) and Vsync (vertical sync signal) in accordance with the sizes of a screen mask in the main and sub scan directions. This is because the counters 304 and 305 are required to be reset for each size of the screen mask. The reason why the count signals from the main and sub scan counters 304 and 305 are each four bits is that the number of bits depends on the repetition (cycle) pattern size of the screen mask data value. Specifically, if the mask size is 3×4, the mask repetitive pattern size is 10×10 as shown in FIGS. 14A and 14B so that the output signals from the main and sub scan counters 304 and 305 are each 4 bits.

In the patterns (A) to (P) shown in FIG. 4, data of level "0" (pattern (A) shown in FIG. 4) to data of level "15" (pattern (P) shown in FIG. 4) are stored in the respective memory fields 1 to 16 of the memory 306. Specifically, the data of level "0" of the pattern "A" shown in FIG. 4 is stored in the memory 306 at the memory field 1. Similarly, for the data of respective levels shown in FIGS. 5 to 7, data of the patterns (A) to (P) shown in FIG. 5 are stored in the memory 307, data of the patterns (A) to (P) shown in FIG. 6 are stored in the memory 308, and data of the patterns (A) to (P) shown in FIG. 7 are stored in the memory 309, respectively at the memory fields 1 to 16 starting from the level "0". The memory fields 1 to 16 of the memory 306 have the same address space. For example, when an address "0" is input from the selector 303, each of the memory fields 1 to 16 outputs the first data bit of data of each level. This is also true for the other memories 307 to 309.

Each data in the memories 306 to 309 has 16 gradations (4 bits) from level "0" to level "15", so that the number of memory fields of each memory is 16 (memory fields 1 to 16). The value stored in each memory field of the memory is 8-bit data which is compared with the input monochrome image data (8 bits).

For example, if the value of the output signal 321 of the separation unit 302 is "0", the memory 306 is selected. In this case, if the 6-bit output from the main and sub scan counters is "0", the first data "0" of level "0" from the memory field 1 of the memory 306, the first data "124" from the memory field 2 of the memory 306, . . . , and the first data "250" of level "16" from the memory field 16 of the memory 306, are output at the same time. In this case, if the value of the monochrome image data 300 from the color/monochrome conversion unit 203 is "128", an output of the comparator 311 is (0000000000001111) from MSB at the memory field 16 shown in FIG. 3. This value is encoded by the encoder 312 and a 4-bit signal, for example, "4" is output.

Next, the details of the screen patterns used by the embodiment will be described with reference to FIGS. 8a–8c to 13.

FIGS. 8a–8c are diagrams illustrating general fattening, corresponding to the threshold values shown in FIG. 4.

In FIG. 8a–8c, reference numeral 801 represents the whole screen pattern with the screen angle of about 30 degrees. Reference numeral 802 indicates the order of fattening the screen pattern. Pixels are sequentially painted out in the ascending order of fattening sequential numbers. Reference numeral 803 indicates in a three-dimensional form a state of pixels painted out. A height represents a data value of a pixel. In this example shown at 803, although only three screen masks are shown for the purpose of simplicity, many patterns are actually disposed consecutively. In this screen pattern, the central pixel grows to the maximum value ("256" for 8 bits), and thereafter, the next pixel grows to the maximum value, and so on. The pixels are sequentially grown one after another. With this screen pattern, it is therefore possible to form a dot having a density corresponding to the density of an input image and to reproduce a good half-tone image excepting the edge portion.

Figure 9A:
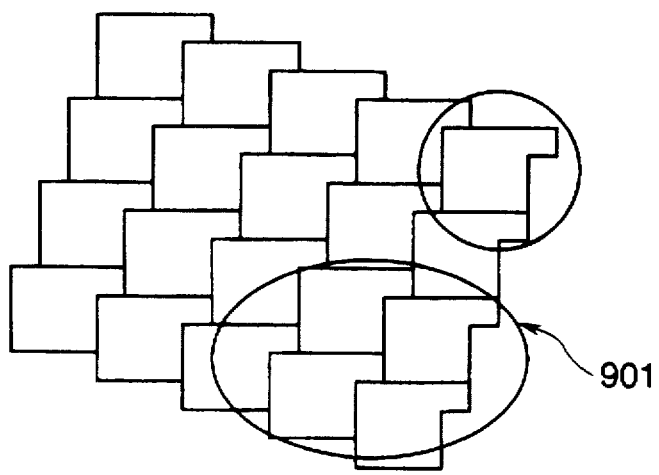
FIGS. 9a–9c are diagrams illustrating a growth of screen pixels using the screen pattern shown in FIG. 5.
Figure 9B:
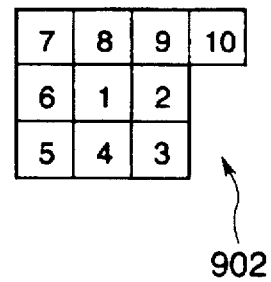
Figure 9C:
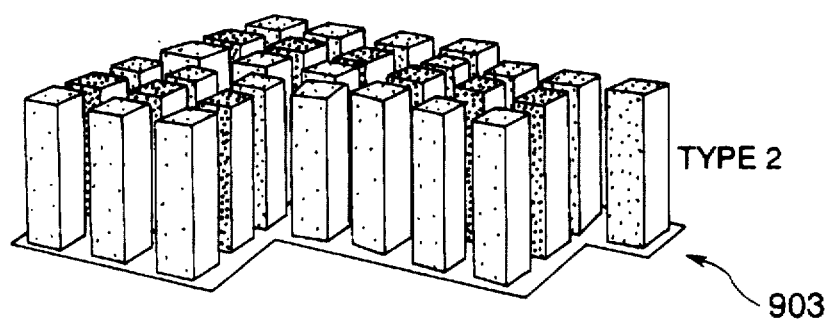

FIGS. 9a–9c illustrate another method of growing screen pixels, corresponding to the threshold values shown in FIG. 5.

Reference numerals 901 and 902 shown in FIGS. 9a and 9b correspond to reference numerals 801 and 802 shown in FIGS. 8a and 8b, and so the descriptions thereof are omitted. Similar to reference numeral 803, reference numeral 903 indicates in a three-dimensional form a state of pixels painted out. As different from the state indicated at 803 in FIG. 8c, pixels grow gently as a whole. With this screen mask, the central pixel continues to grow until an input image data exceeds a predetermined level, and after the input image data exceeds the predetermined value, all the adjacent pixels start growing gently at the same time, with the central pixel value being set higher than the adjacent pixels.

Even if the input image data 300 is strong, pixels with some value are present over the whole area of the screen mask even at a highlighted area. Therefore, the images of fine lines and characters can be formed without notches specific to a general screen. In addition, with this method, since there is no significant screen angle, moire can be advantageously suppressed and a good image quality can be obtained with a less number of bits.

This screen pattern can favorably reproduce fine lines and characters at the edge portion.

Figure 10A:
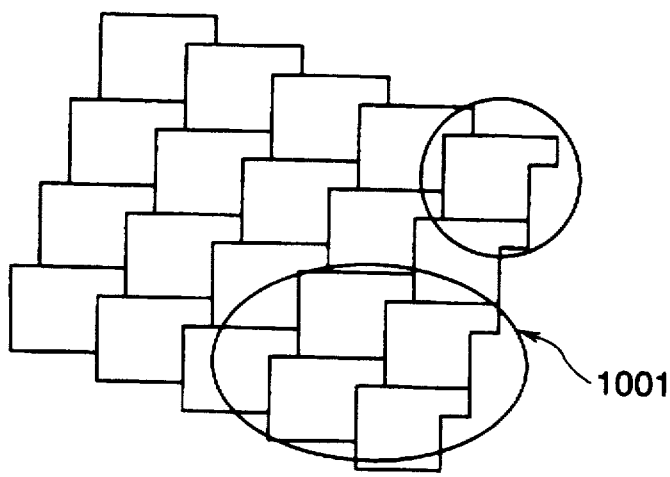
FIGS. 10a–10c are diagrams illustrating a growth of screen pixels using the screen pattern shown in FIG. 7.
Figure 10B:
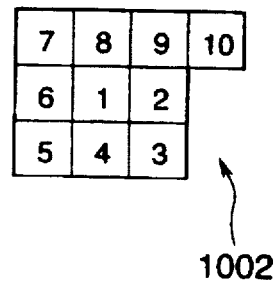
Figure 10C:
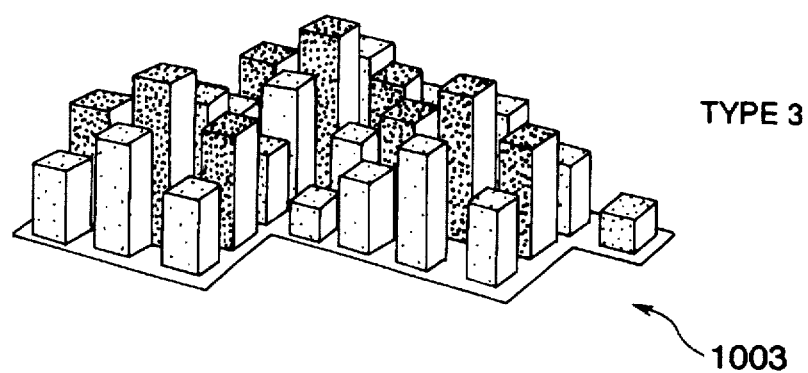

FIGS. 10a–10c illustrate another method of growing screen pixels, corresponding to the threshold values shown in FIG. 7.

Reference numerals 1001 and 1002 shown in FIGS. 10a–10b are similar to those shown in FIGS. 8A & 8B and 9A & 9B, and so the descriptions thereof are omitted. Reference numeral 1003 indicates a state of pixels wherein the central pixel value of each screen mask is high, and the adjacent pixel values become lower toward the periphery of the mask. This state is an intermediary state between those shown in FIGS. 8c and 9c. With this screen pattern, it is possible to form the stable images without notches of originals containing fine lines and characters as well as half-tone originals such as photographs. This method is characterized in that pixels are grown while maintaining a difference of pixel value between the central pixel and adjacent pixels as constant as possible.

A difference of pixel value between the central pixel and adjacent pixels can be set as desired. If dots specific to a screen are intended not to be conspicuous, the difference is set small. Although a variety of screen pattern growth methods may be considered, two types of growth methods are used in this embodiment.

The screen patterns shown in FIGS. 8a to 10c have the same screen angle and different screen tone intensities.

Figure 11:
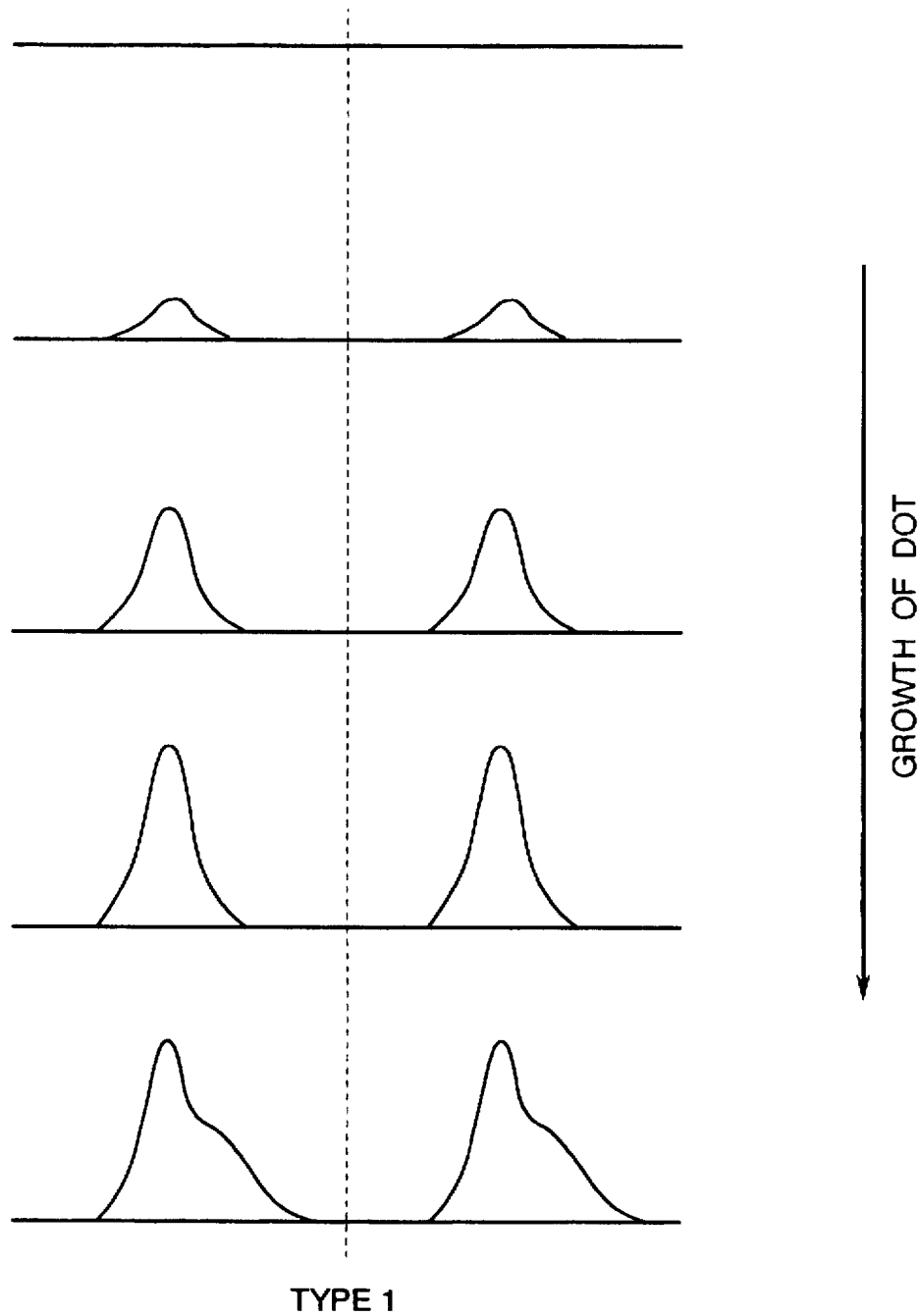
FIG. 11 is a diagram illustrating a growth of dots using the screen pattern shown in FIG. 4.
Figure 12:
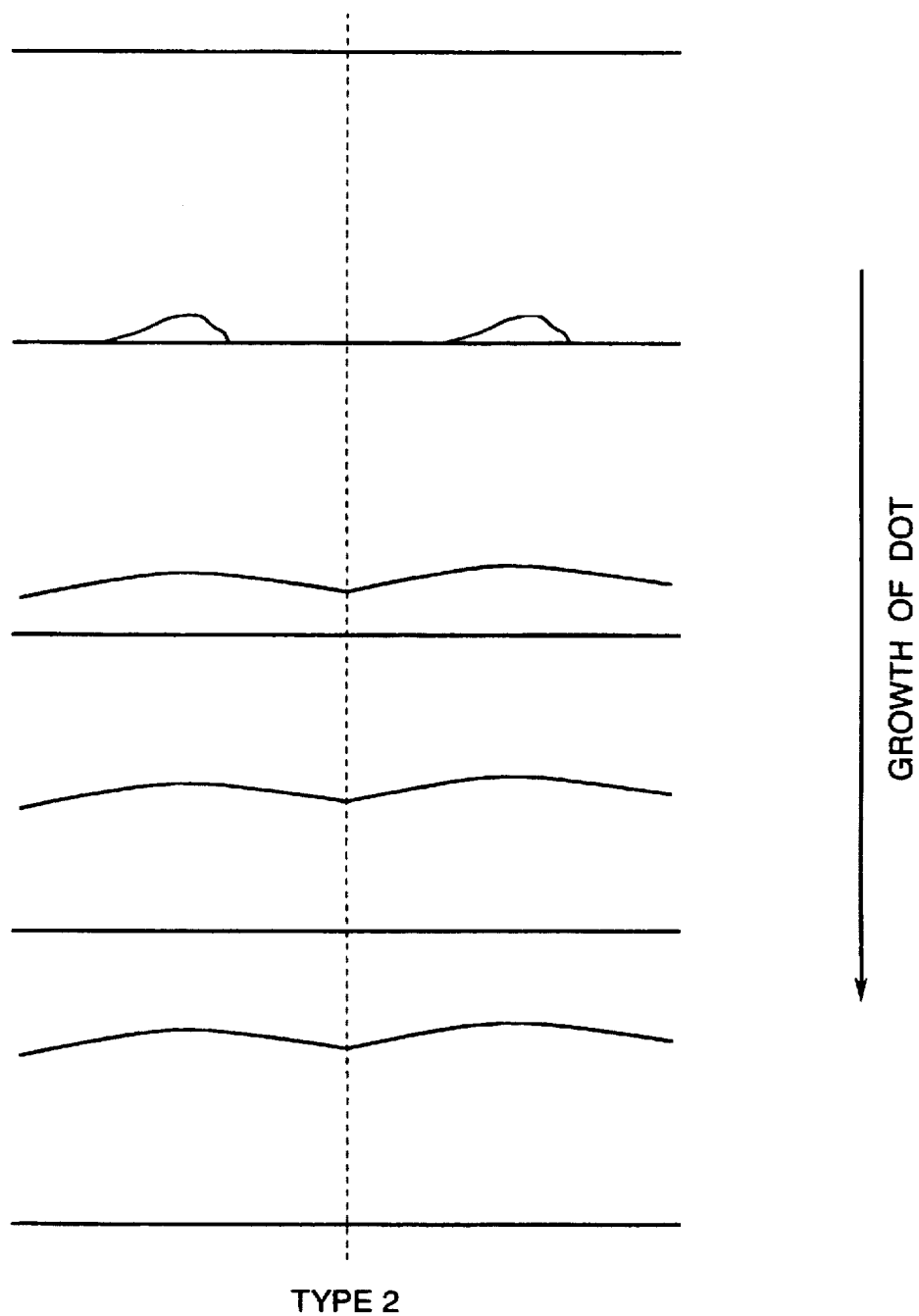
FIG. 12 is a diagram illustrating a growth of dots using the screen pattern shown in FIG. 5.
Figure 13:
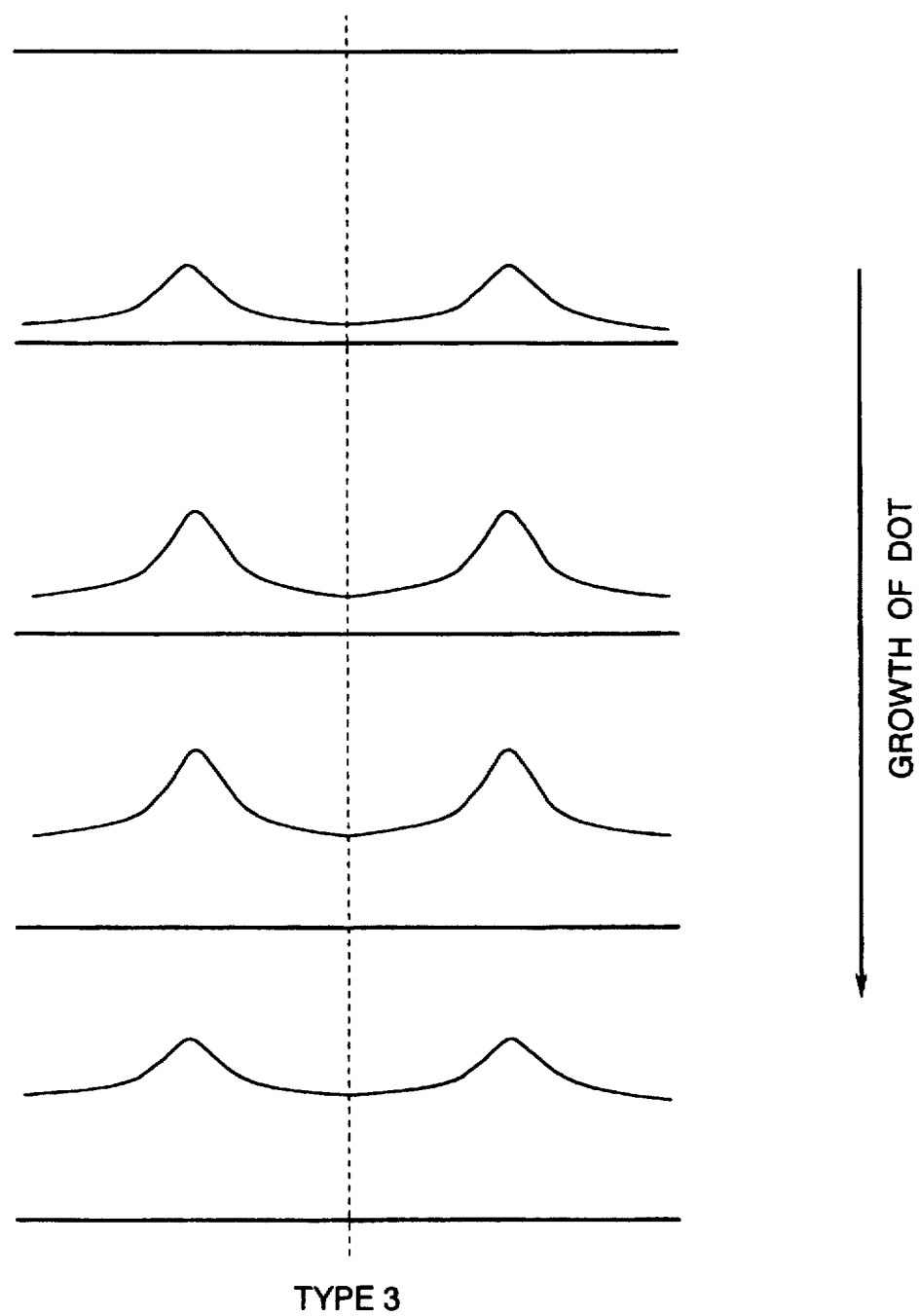
FIG. 13 is a diagram illustrating a growth of dots using the screen pattern shown in FIG. 7.

FIGS. 11 to 13 are diagrams illustrating, from a different viewpoint, the growth of pixels of screen masks shown in FIGS. 8a to 10c.

FIG. 11 shows the screen pattern of FIGS. 8a–8c wherein the horizontal line represents a base value of pixels, the vertical direction indicates a growth state of dots from the upper to the lower in the figure, and a central broken line indicates a boundary between two adjacent screen masks. As seen from FIG. 11, pixels of the adjacent masks do not contact each other immediately after the pixel growth. Accordingly, images of fine lines and characters have notches.

FIGS. 12 and 13 show the screen patterns of FIGS. 9a–9c and 10a–10c wherein the horizontal line represents a base value of pixels, the vertical direction indicates a growth state of dots from the upper to the lower in the figures, and a central broken line indicates a boundary between two adjacent screen masks. As seen from FIGS. 12 and 13, pixels of the adjacent masks contact each other at a relatively earlier stage of the pixel growth. This means that images of fine lines and characters can be formed without notches.

According to the first embodiment of the screen processing method described above, it is possible to output a stable image with concentrated dots for an original having a uniform density such as photographs, and to output an image without notches specific to a general screen pattern for an original containing fine lines and characters.

Without incorporating complicated image area separation for switching between half-tone processing methods for photographs, fine lines, and characters, it is possible to provide an image forming apparatus capable of outputting an image of good quality by using cost effective screen processing.

With the first embodiment described above, a plurality of screen patterns are prepared and a proper one is selected therefrom in accordance with the edge state of input image information. Accordingly, images of fine lines and characters can be formed without notches and half-tone images such as photographs can be reproduced stably.

By preparing a plurality type of screen patterns with different pixel growth and selecting one of them in accordance with the edge state of input image information, it is possible to perform image processing matching the quality of images.

In the above embodiment, the edge detection unit 301 detects an edge of input image information, and in accordance with the detected edge information, a proper screen pattern is selected from a plurality type of screen patterns having different pixel growth stored in advance in the memories. If the screen pattern is selected by an operator, the structure can be simplified.

Figure 15:
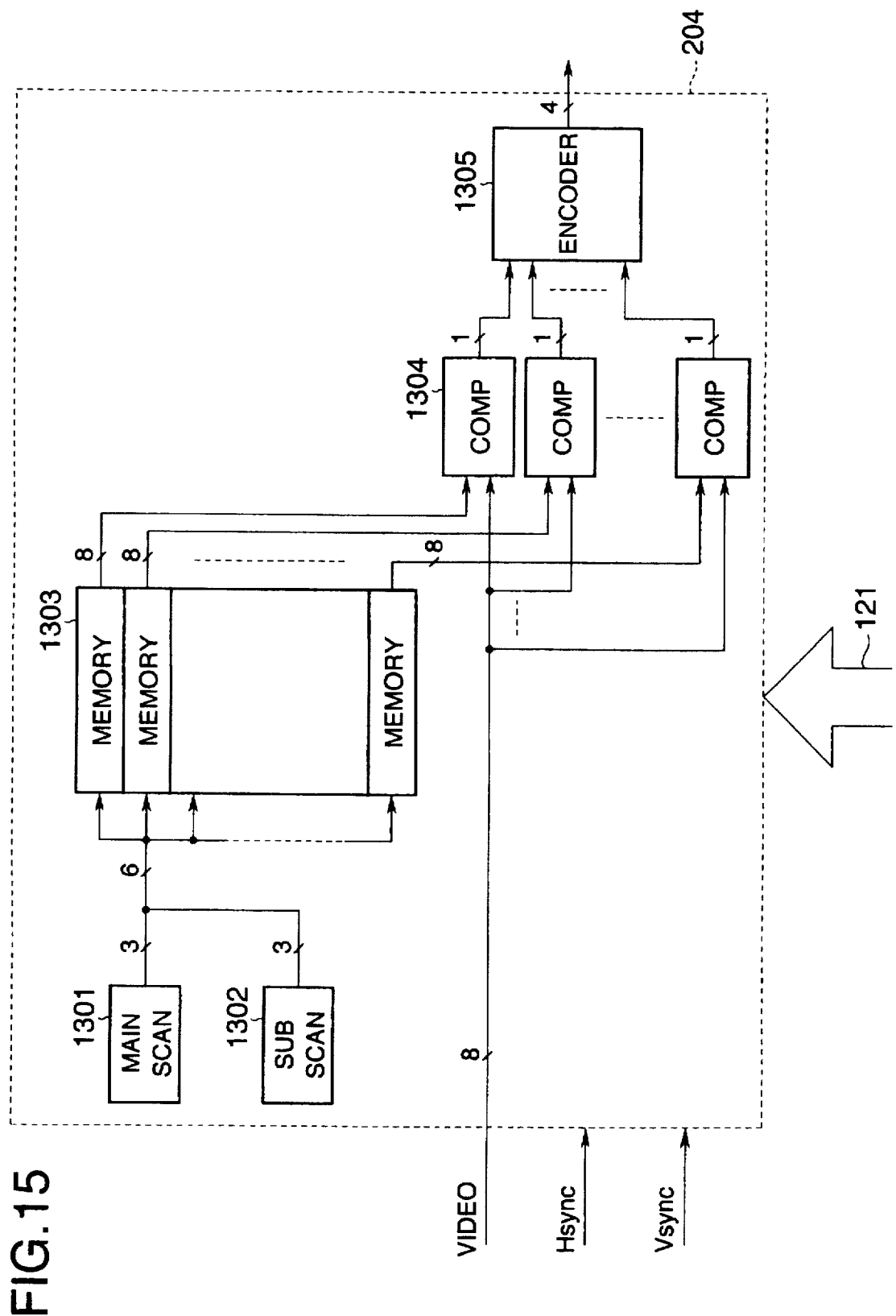
FIG. 15 is a block diagram showing another structure of the screen processing unit.

FIG. 15 shows the structure of a screen processing unit 204 adapted for an operator to select a screen pattern.

The screen pattern data shown in FIGS. 4 to 7 is being stored in RAM 108 shown in FIG. 1. When an operator selects a screen pattern via an unrepresented controller, CPU 106 sets the selected screen pattern data to memories 1303 via the CPU bus 121.

In the screen processing unit 204 shown in FIG. 15, a comparator 1304 compares video data input from the color/monochrome conversion unit 203 with the data in the memories 1303, and the comparison results are encoded by an encoder 1305 to output 4-bit data.

Main and sub scan circuits 1301 and 1302 generate count signals by using Hsync (horizontal sync signal) and Vsync (vertical sync signal) in accordance with the sizes of a screen mask in the main and sub scan directions. This is because the main and sub scan circuits 1301 and 1302 are required to be reset for each size of the screen mask. The reason why the count signals from the main and sub scan circuits 1301 and 1302 are each 3 bits is that the number of bits depends on the repetition (cycle) pattern size of the screen mask data value. Data of a desired screen pattern shown in FIGS. 4 to 7 can be written in each memory 1303 under the control of CPU (FIG. 1). For the screen processing, an access to a particular memory 1303 is achieved by address data sent from the main and sub scan circuits 1301 and 1302 under the control of CPU.

The features of the screen patterns shown in FIGS. 4 to 7 have already been described in connection to the first embodiment, and so the description thereof is omitted. The output results after image data is processed by the screen patterns shown in FIGS. 4, 5, and 7 are shown in FIGS. 16a–16c.

FIG. 16a shows the results processed by the screen pattern of FIGS. 4, 8, and 11. FIG. 16B shows the results processed by the screen pattern of FIGS. 5, 9, and 12, and FIG. 16c shows the results processed by the screen pattern of FIGS. 7, 10a–10c, and 13.

These output results of FIGS. 16a–16c are shown enlarged so as to distinguish between differences of the results. As described above, with the screen processing using the screen patterns shown in FIGS. 5 to 7, the images of fine lines and characters can be output without notches, and moire to be generated by interference with original dots can be reduced.

Furthermore, by selecting one of the screen patterns shown in FIGS. 4 to 7 in accordance with the detected edge information of input image, it becomes possible to perform an optimum screen process most suitable for the quality of input images.

(Second Embodiment)

Next, the second embodiment will be described in which an operator can set a desired method of fattening pixels of a screen.

Figure 17:
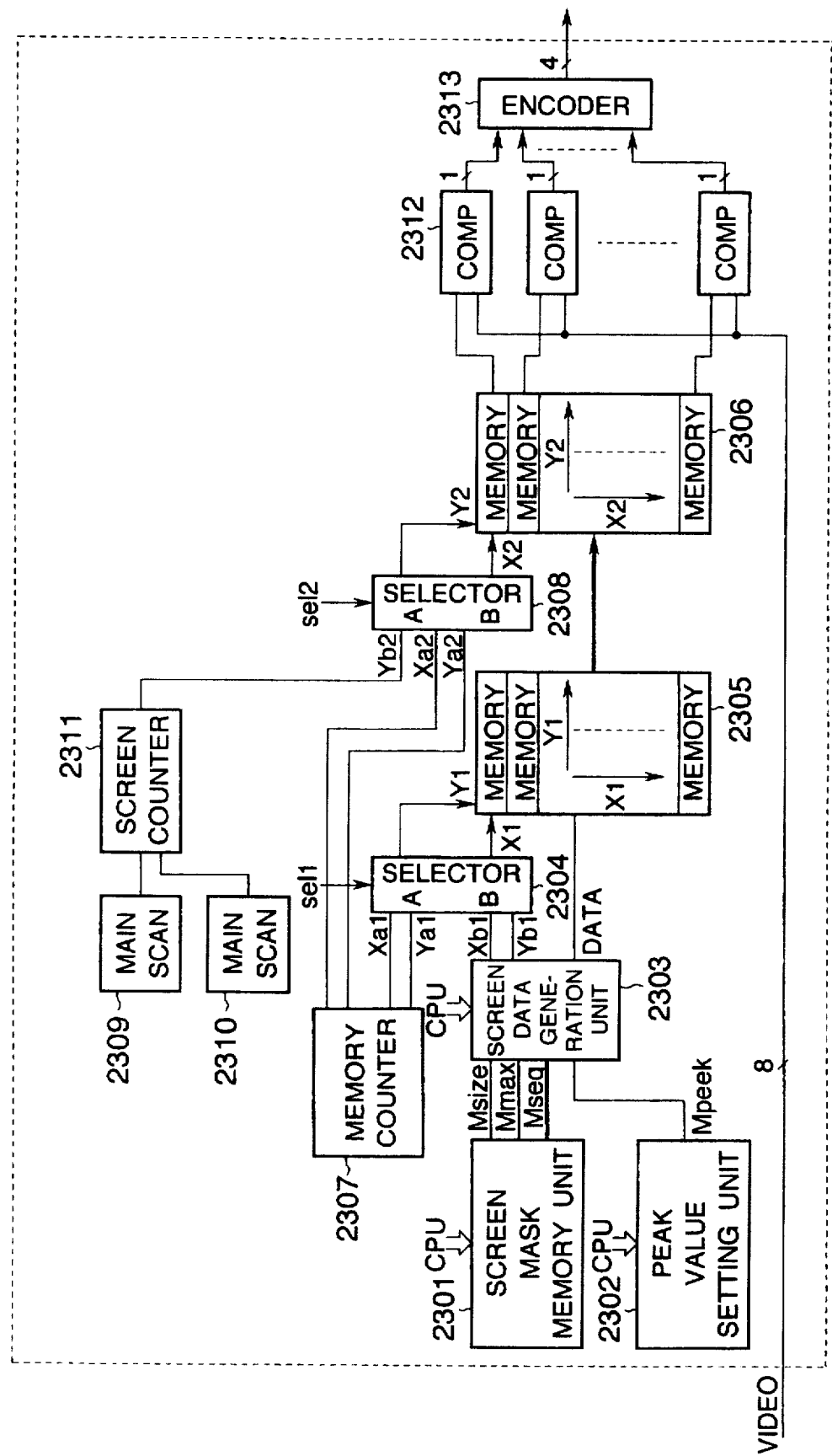
FIG. 17 is a block diagram showing the structure of the screen processing unit of a second embodiment.

The structure of the image forming apparatus of this embodiment is the same as shown in FIG. 1, and the structure of an image processing unit 104 is also the same as FIG. 2. FIG. 17 is a block diagram showing the details of a screen processing unit of the second embodiment. A screen mask memory unit 2301 stores data which allows an operator to select a desired screen via an operation unit. Each screen to be selected has the number of screen lines and a screen angle. Data stored in the screen mask memory 2301 will be described with reference to FIGS. 18a–18c which illustratively show three matrices. Numerals in each matrix indicates the sequential order of growing pixels of the matrix. Pixels are grown in the ascending order of these sequential numbers. For example, in the matrix at the upper left in FIG. 18a, the pixel at the center grows first, the pixel under the central pixel grows next, the pixel to the left of the central pixel grows, and so on. This sequential growth order is represented by "Mseq". The screen angle and the number of screen lines encircled by a right frame in FIG. 18a are displayed on the operation unit for the selection of a screen by a user. As the user selects a screen by referring to the displayed data, a mask size (Msize), a sequential growth order (Mseq) of pixels of the mask, and the number (Mmax) of gradations of the screen are output from the screen mask memory unit 2301.

A peak value setting unit 2302 shown in FIG. 17 is provided for a user to set a desired intensity of a screen. The intensity of a screen determines whether dots of a screen are formed clearly, whether the dost are formed not too much clearly, or whether the dots are formed unclearly. The concept of the peak value setting unit 2302 will be described with reference to FIG. 19. For example, in the case of the upper left drawing of FIG. 19, the mask size of the screen is 3×(3+1), and the height of the central pixel corresponds to a threshold value of the screen matrix. In this example, the matrix is constituted by 10 pixels. Each pixel becomes low as the input image value becomes small, and high as the input image value becomes large. In setting a peak value, which is a main issue of this embodiment, from the operation unit, a threshold value for the central pixel of the matrix is determined as illustrated in the third mask on the left column and the second mask on the right column of FIG. 19. That is, this setting means how a difference of threshold value between the central pixel and adjacent pixels is set. If this difference is made large, an image can be formed with dots of a screen being made clear. If this difference is made small as illustrated in the right column of FIG. 19, an image can be formed with dots of a screen being made unclear. A peak value set by the user via the operation unit is output from the peak value setting unit 2302.

Input to a screen data generation unit 2303 are Msize (matrix size), Mmax (gradation number of screen), and Mseq (sequential pixel growth order in mask) respectively output from the screen mask memory unit 2301, and Mpeak output from the peak value setting unit 2303. This screen data generation unit 2303 will be detailed with reference to a program shown in FIG. 20. First, in order to set a change rate of pixels of each screen matrix, a step value is calculated from the following equation.

Step value=255/{(mask size)×(gradation number−1)}.

Figure 21:
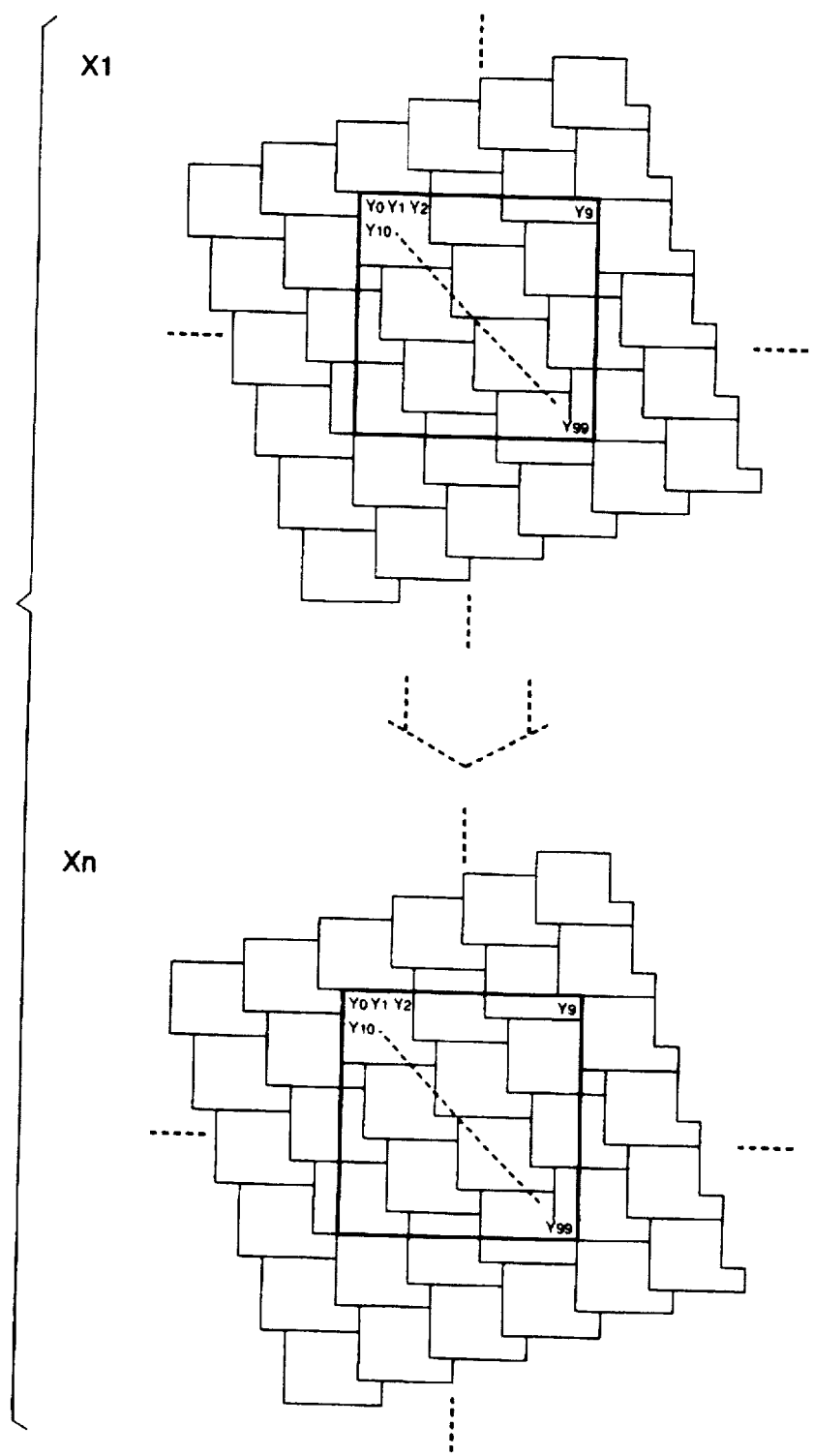
FIG. 21 is a diagram illustrating transfer (mask repetition) of memory contents.
Figure 22:
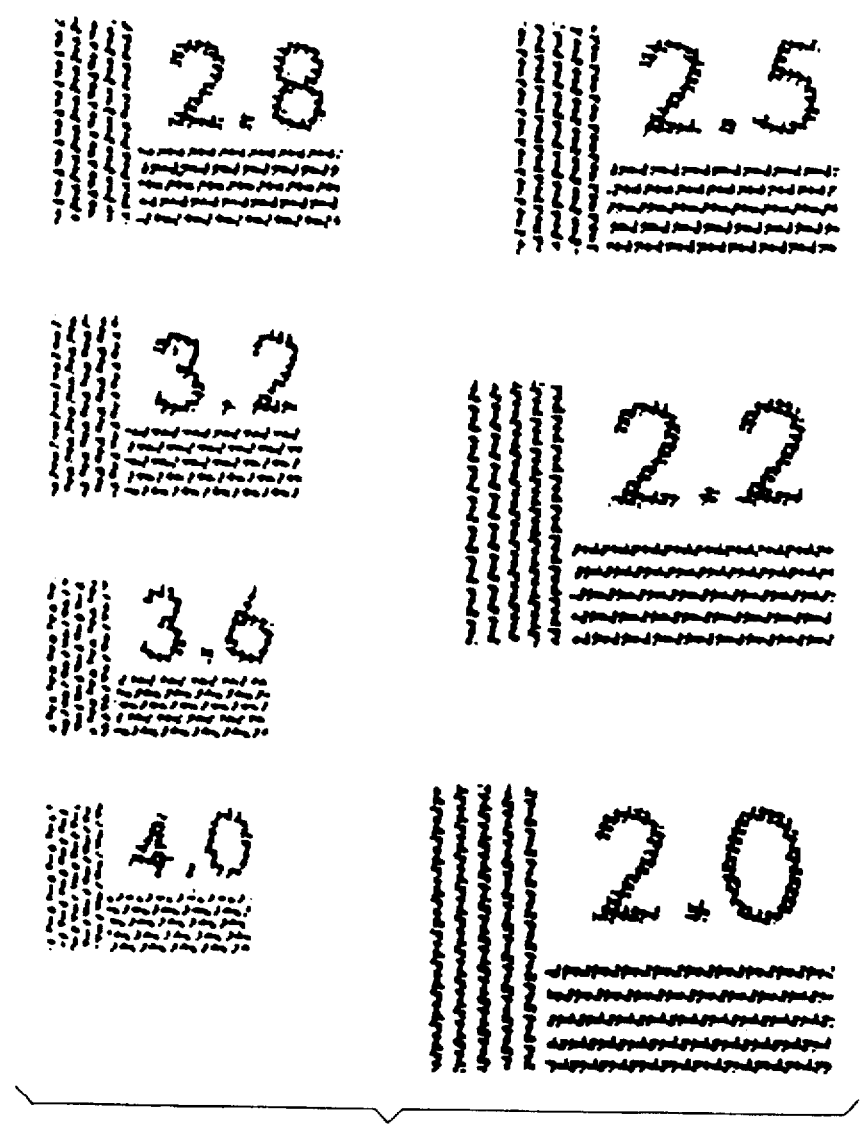
FIG. 22 is a diagram showing output results by a conventional screen process.

Next, after the counter value is reset to "0", at the first double loop (for statement), a pixel value of at each gradation level is grown to the peak value set by the user while outputting X, Y, and counter value (data). Next, at the second double loop (for statement), the remaining pixel values at each gradation level are grown while outputting X, Y, and counter value (data). Mseq used is a signal output from the screen mask memory unit 2301 and indicates the sequential pixel growth order in the matrix. Screen data thus output is stored in a memory 2305. At this time, a selector 2304 is on the B side upon reception of a selector signal (sel1). After all the screen data set is stored in the memory 2305, a memory counter 2307 starts operating so that the contents of the memory 2305 are reallocated and transferred to a memory 2306. At this time, upon reception of selector signals (sel1 and sel2), the selector 2304 and a selector 2308 are on the A side. This data reallocation will be described with reference to FIG. 21. FIG. 21 shows a matrix group (matrices of periodical repetition) at respective gradation levels. Matrices each constituted by 10 pixels are sequentially disposed as shown in the upper drawing of FIG. 21, and the same matrix pattern such as shown in a bold line square is periodically repeated. In transferring the data in the memory 2305 to the memory 2306 shown in FIG. 17, the transfer timings are adjusted basing upon the memory addresses X1, Y1, X2, and Y2 to achieve data reallocation and store the screen threshold value data in the memory 2306.

With the structure described above, after the screen threshold value data set by the user as desired is stored in the memory 2306, the screen process is performed for input image data.

For the screen process, an access to the memory 2306 is enabled by the selector 2308 which switches a memory counter 2307 to a screen counter 2311. A signal from the screen counter 2311 is generated by Hsync and Vsync synchronously with the period as illustrated in FIG. 21. In response to the signal from the screen counter 2311, the memory 2306 outputs all X data at each Y column at the same time. This output data is compared with input video or image data by comparators 2312. If the output of the memory 2306 is smaller than the video data, the comparator 2312 outputs "1". Outputs of the comparators 2312 are encoded by an encoder 2313, and the encoded results are output as a 4-bit signal. This 4-bit data corresponds to the gradation number Mmax of the screen. For example, if Mmax is "8", an output of the encoder 1313 is a 3-bit signal. The encoder 1313 outputs "0" when data (0111111111111111) is input, "2" when data (0011111111111111) is input, . . . , and "15" when data (0000000000000001) is input.

A screen signal value output from the encoder 2313 is supplied to the printer unit 105 whereat 4-bit data is converted into print density data and an image is output.

In the second embodiment described above, a user can set via the operation unit a desired method for fattening pixels of each matrix of a screen.

Therefore, a desired method can be selected by a user from a variety type of image forming methods, such as a method for forming an image with clear dots in a screen, a method for forming an image with rather unclear dots in a screen, and a method for forming an image with unclear dots in a screen with suppressed edge notches.

In the first and second embodiments described above, image data is supplied to the color/monochrome conversion unit 203 of FIG. 2 after it is passed through the gradation correction unit 202. The invention is not limited thereto, but the gradation correction may be performed after the color/monochrome conversion, with the same pattern processing being expected.

A full-color image may be formed without the color/monochrome conversion, by performing the screen process for each C, M, and Y data.

Figure 19:
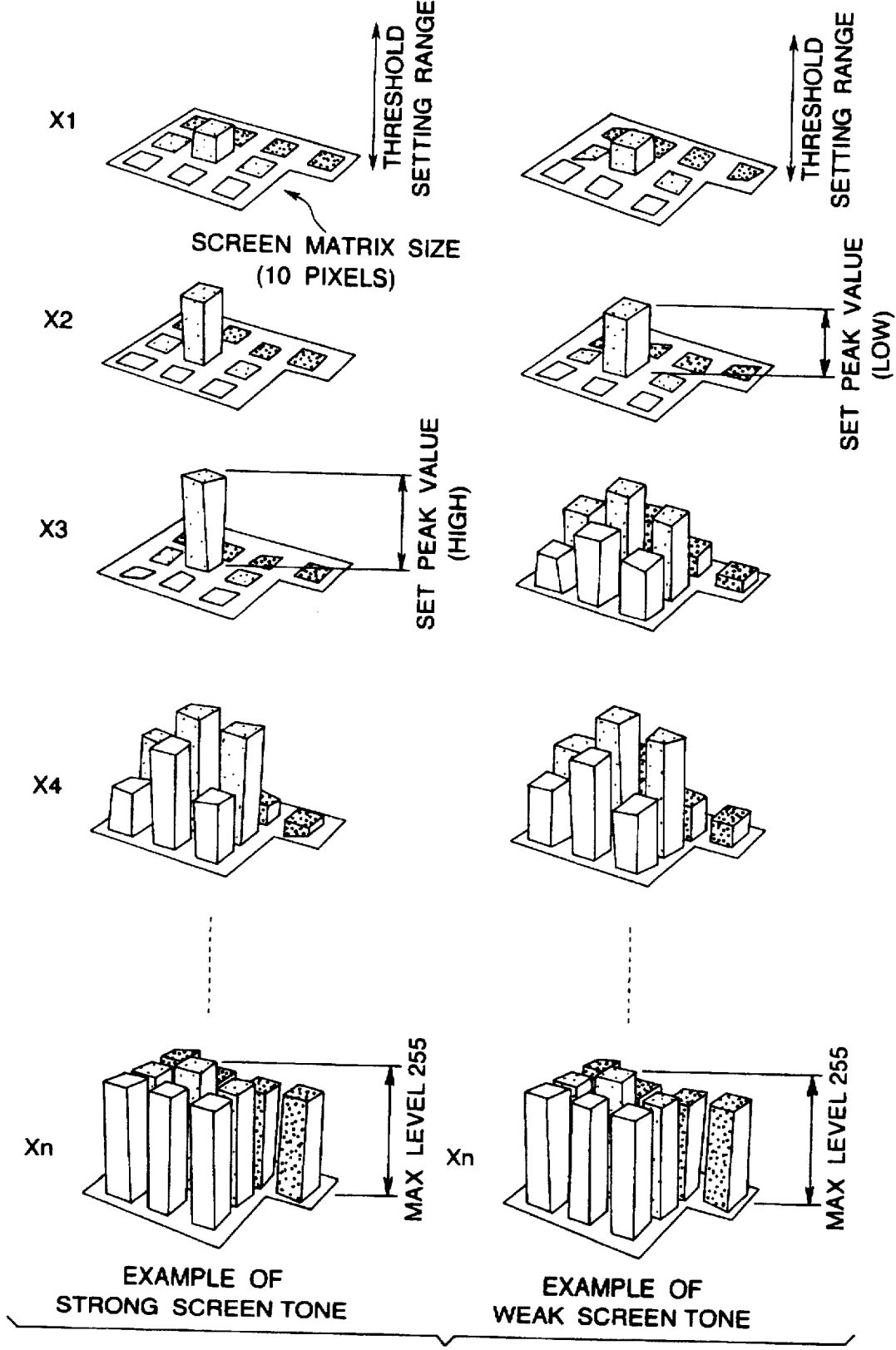
FIG. 19 is a diagram showing examples of strong and weak screen gradations.

Furthermore, in FIG. 19 illustrating the peak value setting of the second embodiment, the peak value of the central pixel when the adjacent pixels start changing is set. The invention is not limited thereto, but the gradation number Xn when the adjacent pixels start changing may be designated. With this setting method, it is possible to make the screen tone strong up to the density set by the user and to make the screen tone weak from the gradation number set by the user.

Still further, in FIG. 19, although the peak value of the central pixel when the adjacent pixels start changing is set, the invention is not limited thereto. For example, a user may set a desired difference of pixel value between the central pixel and adjacent pixels of a matrix and set a desired gradation number Xn until which the set difference is retained. In this manner, the screen tone can be set as desired.

With this arrangement, the central pixel and adjacent pixels can be gradually changed not by starting the change from only the central pixel.

The invention is applicable not only to a system constituted by a plurality of apparatuses including a host computer, interface, printer, and the like, but also to a single apparatus such as a copier. Obviously, the invention is applicable to a system and an apparatus by supplying them with a program. In this case, a medium storing this program constitutes the present invention. The system or apparatus can operate in a predetermined manner by reading the program from the medium.

The present invention has been described with reference to the preferred embodiments. The invention is not intended to be limited only to those embodiments, but various modifications are possible without departing from the spirit of the invention as recited in the appended claims.

What is claimed is:

1. An image processing apparatus comprising:

input means for inputting image information; and conversion means for comparing said input image information with a plurality of threshold values and converting said input image information into data of three or more levels, wherein said conversion means converts said input image information so as to form a dot at the central area of a screen mask if said input image information is low in density, and converts said input image information so as to form dots at the whole area of a screen mask if said input image information is middle and high in density.

2. An image processing apparatus according to claim 1, wherein said conversion means converts said input image information so as to gradually raise a level of all dots of screen masks as the density level of said input image information rises.

3. An apparatus according to claim 1, further comprising:

setting means for setting a degree of a screen; and screen pattern forming means for forming a screen pattern in accordance with the screen degree set by said setting means, wherein said conversion means converts the image information input from said input means in accordance with the screen pattern formed by said screen pattern forming means.

4. An apparatus according to claim 3, wherein said conversion means includes comparison means for comparing the screen pattern formed by said screen pattern forming means with the image information, and decoder means for decoding the comparison results provided by said comparison means and outputting the decoded results as conversion data.

5. An apparatus according to claim 3, wherein the screen pattern has threshold value data having at least three levels per one pixel.

6. An apparatus according to claim 3, further comprising:

storage means for storing a plurality of screen patterns having a different screen angle; and selection means for selecting one of the plurality of screen patterns stored in said storage means, wherein said setting means sets a degree of the screen pattern selected by said selection means.

7. An image processing apparatus comprising:

input means for inputting image information;

storage means for storing a plurality type of screen patterns having different screen intensities;

edge detection means for detecting an edge of the image information input from said input means and outputting edge information representative of the intensity of the detected edge;

selection means for selecting one screen pattern from said plurality type of screen patterns stored in said storage means, wherein said selection means selects a screen pattern to be read from said storage means in accordance with the edge information output from said edge detection means; and conversion means for converting the image information input from said input means in accordance with the screen pattern selected by said selection means.

8. An image processing apparatus according to claim 7, wherein said conversion means includes comparison means for comparing the screen pattern selected by said selection means with said input image information, and decoder means for decoding the comparison results by said comparison means and outputting the decoded results as conversion data.

9. An image processing apparatus according to claim 7, wherein each of said screen patterns has threshold value data having at least three levels per one pixel.

10. An image processing apparatus according to claim 7, wherein said storage means stores at least two types of screen patterns, and each of said screen patterns has the same mask size.

11. An image processing apparatus according to claim 7, wherein said storage means stores at least two types of screen patterns, and each of said screen patterns has the same number of lines.

12. An image processing apparatus according to claim 7, wherein said selection means selects said screen pattern for each pixel of said image information input from said input means.

13. An image processing method comprising the steps of:

inputting image information;

detecting an edge of the input image information and outputting edge information representative of the intensity of the detected edge;

selecting and reading a screen pattern from a plurality type of screen patters having different screen intensities stored in a memory, wherein said selecting and reading step selects and reads a screen pattern from the memory storing the plurality type of screen patterns, in accordance with the output edge information; and converting the image information input from said input means in accordance with said selected and read screen pattern.

14. An image processing method according to claim 13, wherein said conversion step includes the step of comparing the read screen pattern with said input image information, and the step of decoding the comparison results.

15. An image processing method according to claim 13, wherein each of said screen patterns has threshold value data having at least three levels per one pixel.

16. An image processing method according to claim 13, wherein said memory stores at least two types of screen patterns, and each of said screen patterns has the same mask size.

17. An image processing method according to claim 13, wherein said memory stores at least two types of screen patterns, and each of said screen patterns has the same number of lines.

18. An image processing method according to claim 13, wherein said selecting and reading step selects and reads said screen pattern for each pixel of said input image information.

19. An image processing method comprising:

an input step of inputting image information; and a conversion step of comparing the input image information with a plurality of threshold values and converting the input information into data of three or more levels, wherein said conversion step converts the input image information so as to form a dot at the central area of a screen mask if the input image information is low in density, and converts the input image information so as to form dots at the whole area of a screen mask if the input image information is middle and high in density.

20. A method according to claim 19, wherein said conversion step converts the input image information so as to gradually raise a level of all dots of screen masks as the density level of the input image information rises.

21. A method according to claim 19, further comprising:

a setting step of setting a degree of a screen; and a screen pattern forming step of forming a screen pattern in accordance with the screen degree set in said setting step, wherein said conversion step converts the image information input in said input step in accordance with the screen pattern formed in said screen pattern forming step.

22. A method according to claim 21, wherein said conversion step includes a step of comparing the screen pattern formed in said screen pattern forming step with the image information, and a step of decoding the comparison results obtained in said comparison step and outputting the decoded results as conversion data.

23. A method according to claim 21, wherein the screen pattern has threshold value data having at least three levels per one pixel.

24. A method according to claim 21, further comprising:

a step of selecting a desired one of a plurality of screen patterns having a different screen angle stored in a memory, wherein said setting step sets a degree of the screen pattern selected in said selection step.

* * * * *

UNITED STATES PATENT AND TRADEMARK OFFICE
CERTIFICATE OF CORRECTION

PATENT NO. : 5,777,759

DATED : July 7, 1998

INVENTOR(S) : HIROSHI KABURAGI ET AL.

Page 1 of 2

It is certified that error appears in the above-identified patent and that said Letters Patent is hereby corrected as shown below:

In the drawings:

SHEET 17

Figure 17, "Mpeek" should read --Mspeak--.

COLUMN 5

Line 20, "and output" should read --which outputs--.

COLUMN 6

Line 16, "FIG. 8a-8c," should read --FIGS. 8a-8c,--.

COLUMN 7

Line 48, "cost effective" should read --cost-effective--.

COLUMN 8

Line 66, "indicates" should read --indicate--.

UNITED STATES PATENT AND TRADEMARK OFFICE
CERTIFICATE OF CORRECTION

PATENT NO. : 5,777,759
DATED : July 7, 1998
INVENTOR(S) : HIROSHI KABURAGI ET AL.

It is certified that error appears in the above-identified patent and that said Letters Patent is hereby corrected as shown below:

COLUMN 9

Line 16, "dost" should read --dots--.
    Line 42, "unit 2303." should read --unit 2302.--.
    Line 60, "signal (sell)." should read --signal (sell).--.

COLUMN 10

Line 28, "encoder 1313" should read --encoder 2313--;
    Line 29, "encoder 1313" should read --encoder 2313--.

COLUMN 12

Line 46, "patters" should read --patterns--.

Signed and Sealed this

First Day of June, 1999

Attest:

Q. TODD DICKINSON

*Attesting Officer*    *Acting Commissioner of Patents and Trademarks*